US009606905B2

(12) United States Patent
Keromytis et al.

(10) Patent No.: US 9,606,905 B2
(45) Date of Patent: *Mar. 28, 2017

(54) SYSTEMS, METHODS, AND MEDIA FOR TESTING SOFTWARE PATCHES

(71) Applicant: The Trustees of Columbia University in the City of New York, New York, NY (US)

(72) Inventors: Angelos D. Keromytis, New York, NY (US); Stylianos Sidiroglou, New York, NY (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/201,259

(22) Filed: Mar. 7, 2014

(65) Prior Publication Data

US 2014/0189654 A1    Jul. 3, 2014

Related U.S. Application Data

(63) Continuation of application No. 12/302,811, filed as application No. PCT/US2007/012812 on May 31, 2007, now Pat. No. 8,683,450.

(Continued)

(51) Int. Cl.
*G06F 9/44* (2006.01)
*G06F 11/36* (2006.01)

(52) U.S. Cl.
CPC ...... *G06F 11/3692* (2013.01); *G06F 11/3688* (2013.01)

(58) Field of Classification Search
CPC ............ G06F 11/3632; G06F 11/3644; G06F 11/3636; G06F 11/3096; G06F 11/323;
(Continued)

(56) References Cited

U.S. PATENT DOCUMENTS 6,085,029 A * 7/2000 Kolawa ............... G06F 11/3624
714/38.13
6,145,121 A * 11/2000 Levy et al. ................... 717/135
(Continued)

OTHER PUBLICATIONS

Hollingsworth et al, "Dynamic Program Instrumentation for Scalable Performance tools", May 1994, p. 1-10 <InstScalable_94.pdf>.*

(Continued)

*Primary Examiner* — Tuan Vu
(74) *Attorney, Agent, or Firm* — Byrne Poh LLP

(57) ABSTRACT

Systems, methods, and media for testing software patches are provided. The methods include: injecting a software patch into a program; determining a portion of the program modified by the software patch; concurrently executing a first instance of the portion of the program prior to modification by the software patch and a second instance of the portion of the program that has been modified by the software patch; obtaining a first outcome of the first instance and a second outcome of the second instance; comparing the first outcome and the second outcome with a policy associated with the program; and determining whether the software patch has executed correctly based at least in part on the comparison.

22 Claims, 4 Drawing Sheets

Related U.S. Application Data

(60) Provisional application No. 60/809,936, filed on May 31, 2006.

(58) Field of Classification Search
CPC .. G06F 11/3466; G06F 11/3476; G06F 9/328; G06F 11/3612; G06F 11/3624; G06F 11/3692; G06F 11/4425
See application file for complete search history.

(56) References Cited

U.S. PATENT DOCUMENTS

| | | | |
|---|---|---|---|
| 6,721,941 B1* | 4/2004 | Morshed | G06F 11/3612 709/217 |
| 6,848,097 B1 | 1/2005 | Alverson et al. | |
| 7,114,150 B2* | 9/2006 | Dimpsey et al. | 717/131 |
| 7,386,839 B1 | 6/2008 | Golender et al. | |
| 7,386,846 B2 | 6/2008 | Rajaram | |
| 7,389,494 B1* | 6/2008 | Cantrill | 717/125 |
| 7,890,946 B2 | 2/2011 | Blumfield et al. | |
| 2002/0087949 A1* | 7/2002 | Golender et al. | 717/124 |
| 2003/0028757 A1 | 2/2003 | May et al. | |
| 2004/0049667 A1* | 3/2004 | McCormick et al. | 712/233 |
| 2004/0107416 A1 | 6/2004 | Buban et al. | |
| 2005/0066233 A1 | 3/2005 | Day et al. | |
| 2005/0246691 A1 | 11/2005 | Hsieh et al. | |
| 2006/0277539 A1* | 12/2006 | Amarasinghe et al. | 717/168 |
| 2006/0277540 A1 | 12/2006 | Bhattacharya | |
| 2007/0168979 A1 | 7/2007 | Kumar et al. | |

OTHER PUBLICATIONS

Buck & Hollingsworth, "An API for Runtime Code Patching", 2000, p. 1-12 <Buck_RtAPI.pdf>.*
Abadi, M., et al., "Control-Flow Integrity: Principles, Implementations, and Applications", In Proceedings of the 12th ACM Conference on Computer and Communications Security, Alexandria, VA, US, Nov. 7-11, 2005, pp. 340-353.
Candea, G., et al., "Microreboot—A Technique for Cheap Recovery", In Proceedings of Symposium on Operating Systems Design and Implementation, San Fransisco, CA, US, Dec. 2004, pp. 1-14.
Hicks, M., et al., "Dynamic Software Updating", In Proceedings of SIGPLAN Conference on Programming Language Design and Implementation, Jun. 2001, pp. 13-23.
International Preliminary Report on Patentability dated Dec. 3, 2008 in International Patent Application No. PCT/2007/012812.
International Search Report dated Aug. 1, 2008 in International Patent Application No. PCT/US2007/012812.
Luk, C., et al., "Pin: Building Customized Program Analysis Tools with Dynamic Instrumentation", In Proceedings of the ACM SIGPLAN 2005 Conference on Programming Language Design and Implementation, Chicago, IL, US, Jun. 12-15, 2005, pp. 190-200.
Muniswamy-Reddy, K., et al., "A Versatile and User-Oriented Versioning File System", In Proceedings of the Third USENIX Conference on File and Storage Technologies, San Francisco, CA, US, Mar. 2004, pp. 115-128.
Notice of Allowance dated Nov. 1, 2013 in U.S. Appl. No. 12/302,811.
Office Action dated Mar. 11, 2013 in U.S. Appl. No. 12/302,811.
Office Action dated Jul. 27, 2012 in U.S. Appl. No. 12/302,811.
Quigley, D., et al., "UnionFS: User and Community Oriented Development of a Unification Filesystem", In Proceedings of the 2006 Linux Symposium, Ottawa, CA, Jul. 2006, pp. 349-362.
Rinard, M., et al., "Enhancing Server Availability and Security Through Failure-Oblivious Computing", In Proceedings of the 6th Symposium on Operating Systems Design and Implementation, San Francisco, CA, US, Dec. 6-8, 2004, pp. 303-316.
Sidiroglou, S., et al., "Building a Reactive Immune System for Software Services", In Proceedings of the 2005 USENIX Annual Technical Conference, Anaheim, CA, US, Apr. 10-15, 2005, pp. 149-161.
Snyder, P., "tmpfs: A Virtual Memory File System" In Proceedings of the Autumn 1990 EUUG Conference, Nice, FR, Oct. 22-26, 1990, pp. 13-23.
Somayaji, A., et al., "Automated Response Using System-Call Delays", In Proceedings of the 9th Conference on USENIX Security Symposium, Denver, CO, US, Aug. 14-17, 2000, pp. 1-13.
Srivastava, A., et al., "Atom—A System for Building Customized Program Analysis Tools", In Proceedings of the ACM SIGPLAN 1994 Conference on Programming Language Design and Implementation (PLDI '94), Orlando, FL, US, Jun. 20-24, 1994, pp. 196-205.
Written Opinion dated Aug. 1, 2008 in International Patent Application No. PCT/US2007/012812.

* cited by examiner

SYSTEMS, METHODS, AND MEDIA FOR TESTING SOFTWARE PATCHES

CROSS-REFERENCE TO RELATED APPLICATIONS

This application is a continuation of U.S. patent application Ser. No. 12/302,811, filed Nov. 28, 2008, which is the U.S. National Phase Application under 35 U.S.C. §371 of International Application No. PCT/US2007/012812, filed May 31, 2007, which claims the benefit of U.S. Provisional Patent Application No. 60/809,936, filed May 31, 2006, which are hereby incorporated by reference herein in their entireties.

TECHNICAL FIELD

The disclosed subject matter relates to systems, methods, and media for testing software patches.

BACKGROUND

Despite decades of research and development efforts for, and the resulting improvement in, software reliability, software defects still account for many system failures. Moreover, methods for retroactively dealing with software defects, such as software patches, can often introduce latent and/or new defects.

The problem is further exacerbated by the burgeoning popularity of service oriented computing (SOC) systems, such as online commerce, e-mail, Internet Protocol (IP) telephony, and grid computing, and the availability requirements accompanying such systems. In order to update SOC systems to fix existing software defects and vulnerabilities, system administrators need to strike a careful balance between bringing a system down for installing updates and keeping the system available for processing service requests.

Unfortunately, most SOC systems are long-running servers that a mass considerable operational state data and, therefore, the option of launching another machine to test the effects of software patch(es) is limited.

System administrators can test software patches on a non-production machine and mirror the resulting traffic to the corresponding production system. Because the machines are disjoint, however, there are some drawbacks. First, comparison of two or more mirrored machines requires some level of cross-system synchronization, which, in turn, adds considerable overhead. Second, when dealing with encrypted traffic, a proxy would need to be employed, thereby adding complexity and causing performance degradation.

SUMMARY

Systems, methods, and media for testing software patches are provided. In some embodiments, methods for testing software patches are provided. The methods include: injecting a software patch into a program; running multiple instances of a part of the program containing the software patch; obtaining outcomes of the multiple instances; and determining, using the outcomes, whether the software patch executes correctly.

In some embodiments, computer-readable media containing computer-executable instructions that, when executed by a processor, cause the processor to perform a method for testing software patches, are provided. This method includes: injecting a software patch into a program; running multiple instances of a part of the program containing the software patch; obtaining outcomes of the multiple instances; and determining whether, using the outcomes, the software patch executes correctly.

In some embodiments, systems for testing software patches are provided. The systems include: elements for injecting a software patch into a program; elements for running multiple instances of a part of the program containing the software patch; elements for obtaining outcomes of the multiple instances; and elements for determining, using the outcomes, whether the software patch executes correctly.

In some embodiments, systems for testing software patches are provided. The systems include: an execution environment capable of injecting a software patch into a program and running multiple instances of a part of the program containing the software patch; and a supervision component capable of obtaining outcomes of the multiple instances and determining, using the outcomes, whether the software patch executes correctly.

Systems, methods, and media for testing software patches are provided. In some embodiments, methods for testing software patches are provided. The methods include: injecting a software patch into a program; determining a portion of the program modified by the software patch; concurrently executing a first instance of the portion of the program prior to modification by the software patch and a second instance of the portion of the program that has been modified by the software patch; obtaining a first outcome of the first instance and a second outcome of the second instance; comparing the first outcome and the second outcome with a policy associated with the program; and determining whether the software patch has executed correctly based at least in part on the comparison.

In some embodiments, methods for testing software patches are provided. The methods include: injecting a first software patch and a second software patch into a program; determining a portion of the program modified by the first software patch and the second software patch; concurrently executing a first instance of the portion of the program that has been modified by the first software patch and a second instance of the portion of the program that has been modified by the software patch; obtaining a first outcome of the first instance and a second outcome of the second instance; comparing the first outcome and the second outcome with a policy associated with the program; determining which of the first software patch and the second software patch executed correctly based at least in part on the comparison; and terminating at least one of the first software patch and the second software patch based on the determination.

In some embodiments, systems for testing software patches are provided. The systems include a hardware processor that is configured to: inject a software patch into a program; determine a portion of the program modified by the software patch; concurrently execute a first instance of the portion of the program prior to modification by the software patch and a second instance of the portion of the program that has been modified by the software patch; obtain a first outcome of the first instance and a second outcome of the second instance; compare the first outcome and the second outcome with a policy associated with the program; and determine whether the software patch has executed correctly based at least in part on the comparison.

In some embodiments, systems for testing software patches are provided. The systems include a hardware processor that is configured to: inject a first software patch and a second software patch into a program; determine a portion of the program modified by the first software patch and the second software patch; concurrently execute a first instance of the portion of the program that has been modified by the first software patch and a second instance of the portion of the program that has been modified by the software patch; obtain a first outcome of the first instance and a second outcome of the second instance; compare the first outcome and the second outcome with a policy associated with the program; determine which of the first software patch and the second software patch executed correctly based at least in part on the comparison; and terminate at least one of the first software patch and the second software patch based on the determination.

DETAILED DESCRIPTION

Systems, methods, and media for testing software patches are provided. In some embodiments of the disclosed subject matter, systems, methods, and media are provided for testing software patches inserted into programs in a production machine, such as a production server, prior to system deployment. In some embodiments, software patches are injected while the programs are executing.

In some embodiments, a binary software patch can be injected into a program, such as a server application, using binary injection techniques so that when an instance of the program reaches targeted program segment(s), multiple instances of the program will be spawned to run the targeted program segment(s) either in parallel or in sequence. In some embodiments, multiple software patches are injected into a program. The output of the multiple instances can then be used to determine whether the patch(es) execute correctly. In some embodiments, software patches are injected while the program is executing. In some embodiments, a validation mechanism of a software patch is also injected along with the software patch.

In some embodiments, an emulator, such as a virtual machine, is used to run multiple instances of the targeted segment(s) of the program. For example, the multiple instances can run in the emulator either in sequence or in parallel. The emulator, containing a set of logic for supervising running instances, can determine whether an exception indicating a failure is raised while each instance is executed. The emulator can also record the modifications made by each instance to the program memory and keep track of input and/or output transactions that each instance makes. In some embodiments, the emulator is injected into the program using an application programming interface (API) for runtime code patching.

In some embodiments, an operating system kernel is used to run multiple instances of the targeted segment(s) of the program. For example, the multiple instances can run in sequence or in parallel using a set of kernel functions, referred to as system calls, that can access and modify the memory space of the program. For instance, kernel functions can insert a software patch into the program, spawn and run multiple instances of the program to execute the targeted segment(s), detect and catch exceptions thrown by the multiple instances, and record program state changes.

Figure 1:
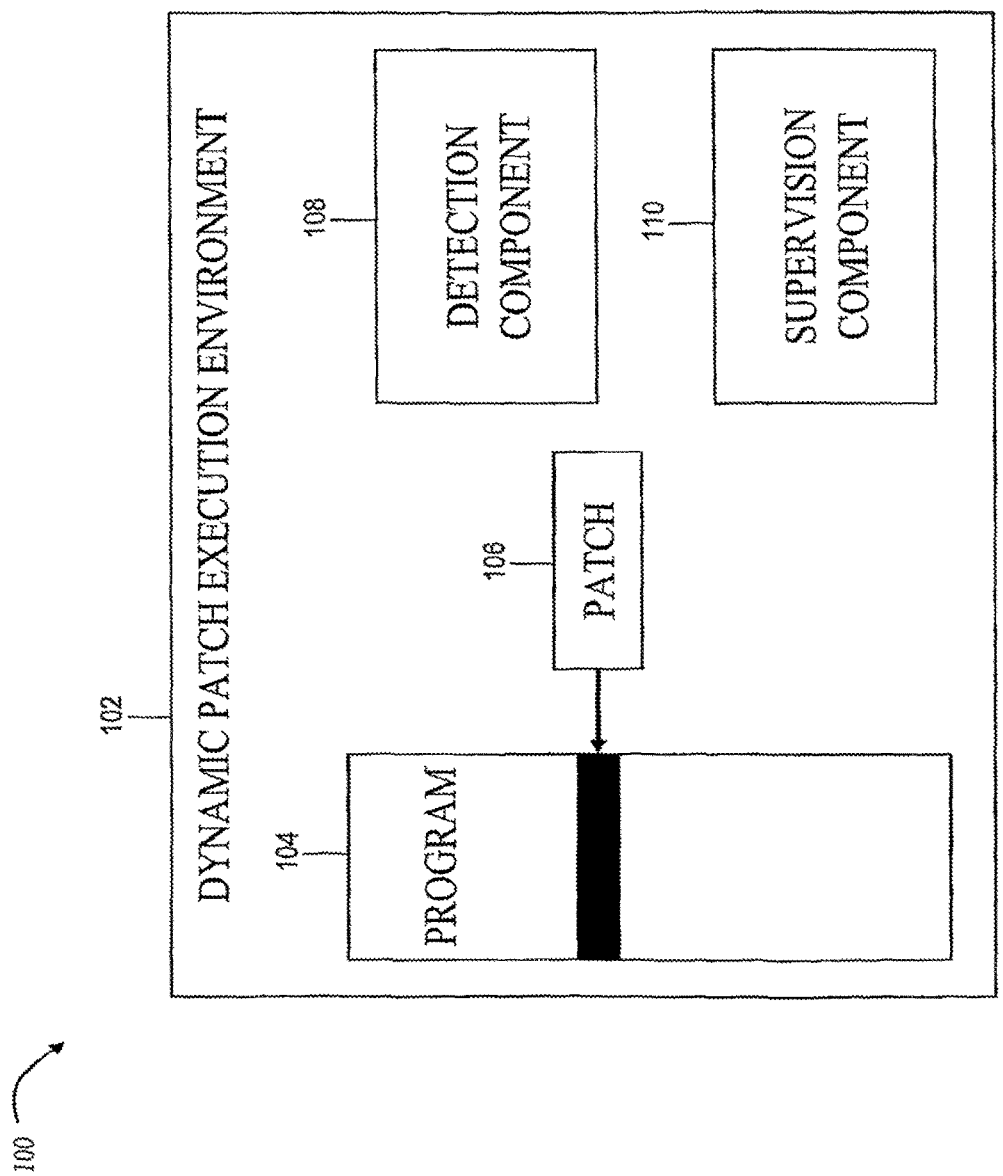
FIG. 1 is a schematic diagram of a system for testing software patches in accordance with some embodiments of the disclosed subject matter.

Referring to FIG. 1, a system 100 includes a dynamic patch execution environment 102, a program 104 that needs to be updated, a patch 106, a detection component 108, and a supervision component 110.

Dynamic patch execution environment 102 can be a library of application program interfaces (API) for runtime code patching, such as Dyninst, or various other suitable runtime program instrumentation tools. The API can, for example, attach to program 104, create a new bit of code, and insert the new code into program 104.

Program 104 can continue execution while being modified and, therefore, program 104 does not need to be re-compiled, re-linked, and/or restarted. For instance, the next time the modified program executes the block of code that has been modified, the new code is executed in addition to, or in lieu of, the original code. The API can also change subroutine calls or remove them from program 104.

The API can make modifications to both the code and data of program 104. For example, the API can be used by a programmer, a user, or a system administrator. For instance, a programmer can insert instrumentation code during the development of a software application for subsequent patch testing.

Dynamic patch execution environment 102 can provide an environment in which patch 106 can be applied to multiple service instances of program 104. In some embodiments, patch 106 is inserted into program 104 and an instance of program 104 is run such that the part of program 104 containing patch 106 is executed multiple times within the same execution of program 104. In some embodiments, multiple instances of the part of program 104 containing patch 106 are run in parallel.

Program 104 can be a software application in a system, such as an SOC system. Program 104 also can be various other suitable programs that require high availability and/or frequent runtime updates or modifications.

Patch 106 can be a simple logic defect fix, a software update designed to close a vulnerability loophole, and/or any other suitable fix or update. In some embodiments, patch 106 is used to test implementation of new computing techniques. For example, an instance of the implementation of a controversial, unproven computing technique can be tested by placing the implementation into patch 106.

Detection component 108 can detect and examine software exceptions thrown by the multiple instances of the part of program 104 containing patch 106. Supervision component 110 can obtain outcomes of the multiple instances. It can also determine whether patch 106 executes correctly using the outcomes of the multiple instances. Supervision component 110 can be invoked whenever all of the multiple instances reach predefined points in their execution or when software exceptions are detected by detection component 108. Both detection component 108 and supervision component 110 can be a shared library that can be injected at specific locations in program 104.

Figure 2:
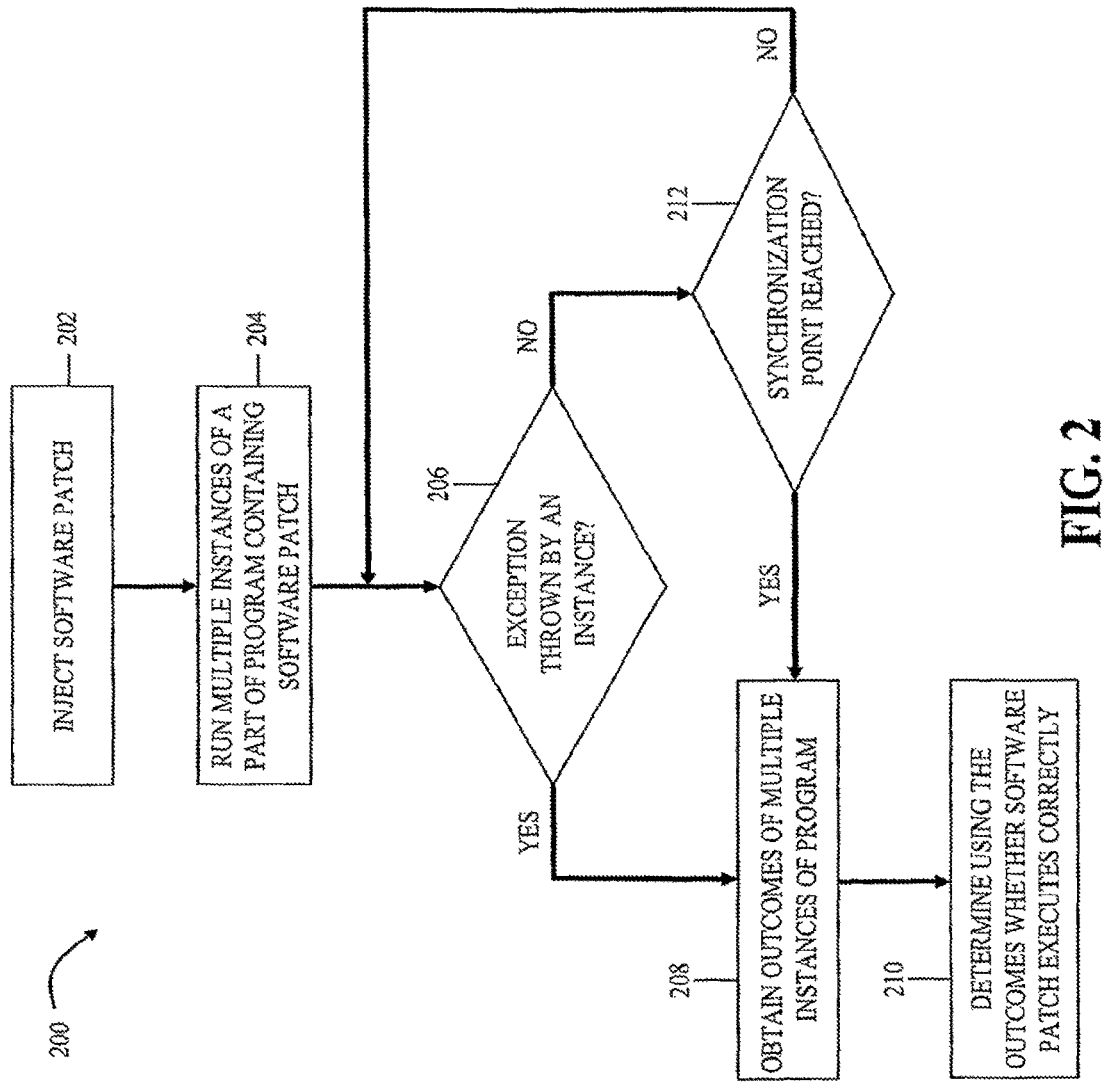
FIG. 2 is a simple illustration of a method for testing software patches in accordance with some embodiments of the disclosed subject matter.

Referring to FIG. 2, a method 200 tests software patches to determine whether the software patches execute correctly.

As shown, at 202, a software patch, such as patch 106, is injected into a program, such as program 104. In some embodiments, a runtime instrumentation injection technique is employed. For example, Dyninst API can be used to inject instrumentation code into an active server application, such as a financial transaction server. For instance, Dyninst API can be used to insert instrumentation code, referred to as instrumentation trampolines, that can point to the different versions of the software patch under test. Dyninst API also can be used to insert instrumentation trampolines that can point to the instrumentation code that can examine and compare the output of the software patch.

At 204, multiple instances of a part of the program containing the software patch are run. In some embodiments, one or more execution threads are created and a function or a procedure is copied into the execution threads, in order for the execution threads to run the function or procedure in parallel. In some embodiments, the execution threads are created and run such that they do not interfere with one another (i.e., each thread is oblivious of the presence of other threads).

Suppose, for example, a software patch is inserted to modify the logic of a function in the program. When the program execution reaches the function, one or more execution threads can be created. The function can be then copied onto each of the execution threads such that the execution threads can execute the function.

At 206, it is determined whether an exception is thrown by any of the multiple instances of the part of the program. In some embodiments, a separate module, such as detection component 108, is used to catch exceptions thrown by the multiple instances.

If an exception thrown by one of the multiple instances is detected at 206, the outcomes of the multiple instances are obtained at 208. For example, the outcomes of the multiple instances can be one or more characteristics indicative of the end-state of the execution of the multiple instances. In some embodiments, for instance, memory traces of each of the multiple instances are used as the outcomes of the multiple instances. For example, allocation and de-allocation (i.e., deletion) of memory blocks at the library/system call level can be tracked to fingerprint the execution of each multiple instances.

In some embodiments, input/output (I/O) transactions are used as the outcomes of the multiple instances. For example, a file system view can be duplicated to be attached to each instance of the part of the program. The file system view for each instance of the program can then be compared later to find any inconsistencies. In some embodiments, the program's external behavior(s) are used as the outcomes of the multiple instances. For example, information printed or displayed on a display screen can be used as the outcomes.

In some embodiments, the multiple instances are stopped before obtaining the outcomes when an exception is thrown. In some embodiments, only the program instance that has thrown an exception is stopped while the remaining instances of the program continue running In some embodiments, the exception is handled to recover the excepted instance of the program from the failure causing the exception. In some embodiments, detection component 108 handles the exception to recover the excepted instance of the program.

In some embodiments, the multiple instances are run one instance at a time in sequence. An instance of the part of the program, for example, can run first and its outcome, such as the resulting program state, can be saved before rolling back the program state to run the next instance. Once the program state is restored, the next instance of the program can run and the same process can repeat for subsequent instances. In some embodiments, each saved program state can be used to determine whether the part of the program containing the software patch executes correctly. In some embodiments, the process of running multiple instances is stopped once an instance of the program runs without raising an exception.

If, however, no exception is detected at 206, it is further determined at 212 whether all of the multiple instances of the program have reached a predefined synchronization point. For example, the predefined synchronization point can be the end of the software patch injected at 202. If it is determined at 212 that all of the multiple instances of the program have not reached the synchronization point yet, then 206 is repeated. If, however, it is determined at 212 that all of the multiple instances of the program have all reached the synchronization point, then the outcomes of the multiple instances are obtained at 208.

At 210, it is determined using the outcomes whether the software patch executes correctly. In some embodiments, determining the correctness of the software patch execution is based primarily on policy. For example, a correct base instance or observed normal operation can define the measure of correctness of the software patch execution in a program, such as program 104. Suppose, for instance, network routers are periodically retrofitted with vulnerability patches. If it is observed that the network routers operate normally after the patches have been inserted, it can be concluded that the patches execute correctly.

In some embodiments, variations from well-defined invariants and specifications of the program state resulting from execution of the multiple instances can define the measure of correctness of the software patch execution in the program. For example, values returned from one or more functions invoked by the multiple instances can be checked against predefined correct return values from the functions.

Figure 3:
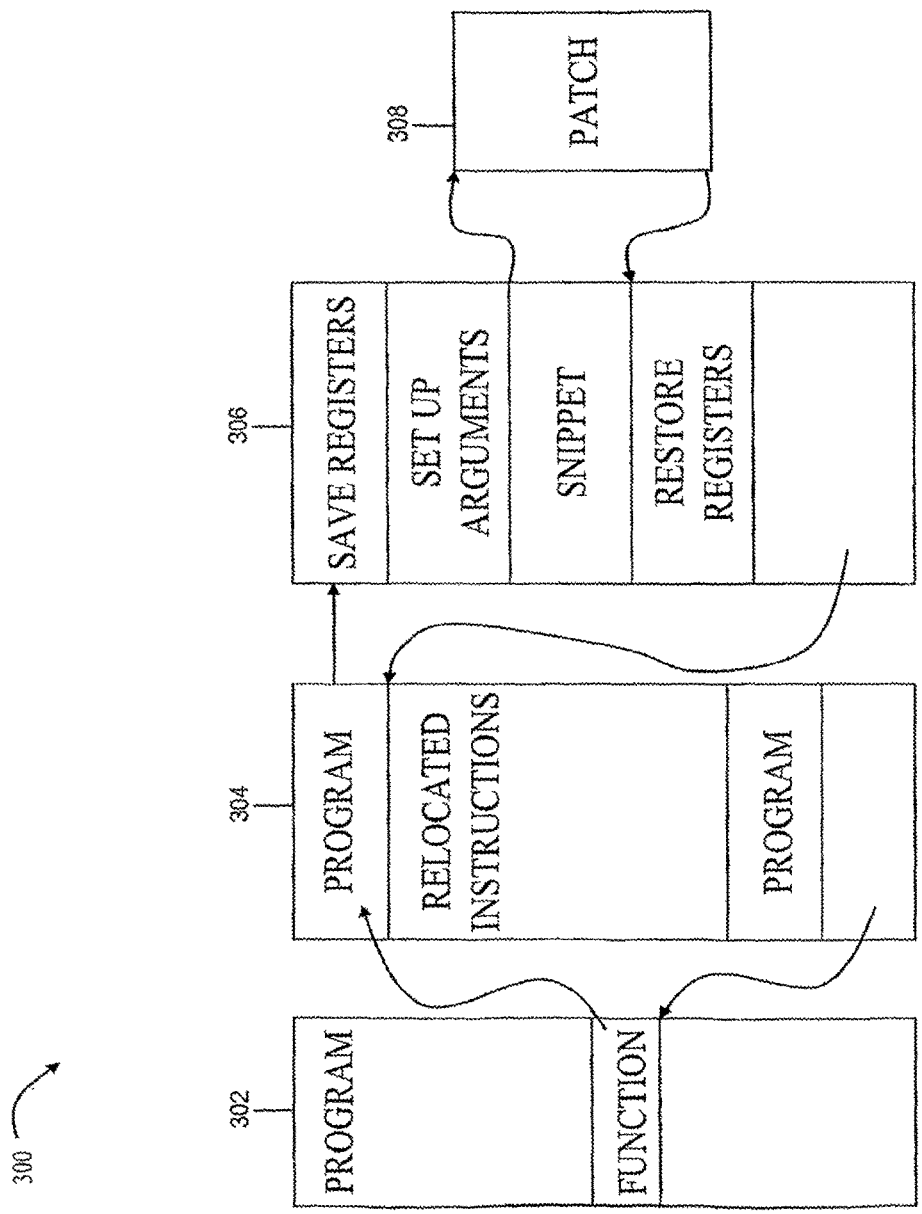
FIG. 3 is an illustrative diagram for injecting software patches into a program in accordance with some embodiments of the disclosed subject matter.

Referring to FIG. 3, a diagram 300 illustrates a graphical example of injecting software patches into a program using Dyninst API.

To instrument a point in a program 302, one or more instructions in program 302 can be relocated and replaced with a jump to a base trampoline 304. Base trampoline 304 can be used to modify the original code of program 302 such that the original code can branch into the newly generated code. Base trampoline 304 contains a jump to a mini-trampoline 306 and contains space for the relocated instructions from original program 302.

Mini-trampoline 306 contains the instructions for performing the desired functionality stored in a patch 308 as well as for saving and restoring the state information of program 302, such as the register values and the program counter. For example, mini-trampoline 306 can call an existing function or run a snippet of code that has been created and inserted into program 302 using Dyninst API.

In some embodiments, more than one mini-trampoline 306 can be inserted at the same point in program 302. For example, multiple mini-trampolines 306 can be chained together such that the end of one mini-trampoline 306 can branch to the start of the next mini-trampoline 306, and the last mini-trampoline 306 can branch back to base trampoline 304, which, in turn, can branch back to program 302.

Figure 4:
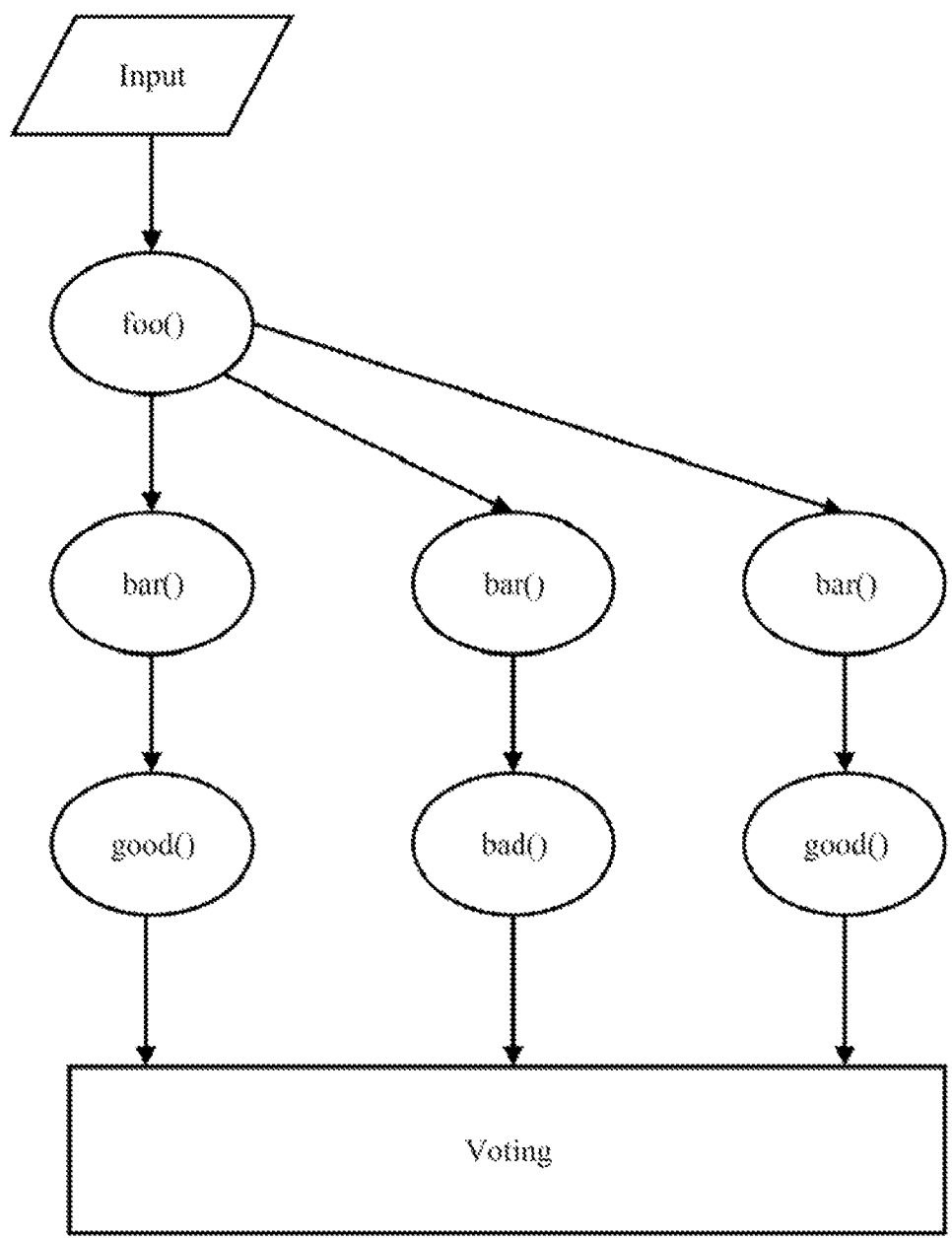
FIG. 4 is an illustrative diagram of a process for testing software patches for a running service in accordance with some embodiments of the disclosed subject matter.

Turning to FIG. 4, a diagram of an example 400 of a process for testing software patches for a running service is shown in accordance with some embodiments of the disclosed subject matter. As illustrated, the service can be replicated and multiple instances can proceed concurrently in an execution environment until an event is generated. At that point, all running instances can reach a consensus on the "correct" execution.

In some embodiments, the process may be implemented by an execution component and a decision component. In some embodiments, the voting component can be implemented as a shared library that can be injected at one or more suitable locations of the program. In some embodiments, the execution component can be invoked at function foo( ), allowing for the simultaneous deployment of two patches or two versions of a patch (or any suitable number of patches). At that time, two more instances of the service can be created. In some embodiments, execution can continue normally for all instances until a predefined point in the execution is reached or an exception is raised.

In some embodiments, for example, one or more synchronization points can be defined dynamically and serve the purpose of detecting execution and state divergence. In such an example, at a synchronization point, all of the outcomes of the executions can be automatically compared and appropriate action can be taken according to the policy described above. Additionally or alternatively, if an exception is raised, the execution of all concurrent threads can be stopped. The states of the threads can then be compared. In some embodiments, if one of the patched executions is determined to be correct, all of the executions can be terminated.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims which follow. Features of the disclosed embodiments can be combined and rearranged in various ways.

What is claimed is:

1. A method for testing software patches, the method being implemented with at least one hardware processor and a memory having computer-executable instructions stored thereon that, when executed by the at least one hardware processor, cause the at least one hardware processor to perform the method steps, comprising:
   injecting, using a hardware processor, a software patch into a program;
   determining, using the hardware processor, a portion of the program modified by the software patch;
   concurrently executing, using the hardware processor, a first instance of the program in which the portion of the program has not been modified by the software patch and a second instance of the program in which the portion of the program that has been modified by the software patch;
   determining, using the hardware processor, that an event has been generated from the first instance of the program and the second instance of the program;
   determining, using the hardware processor, a correct execution between the first instance of the program being executed and the second instance of the program being executed by:
      obtaining a first outcome that includes state information of the first instance and a second outcome that includes state information of the second instance in response to determining that the event has been generated;
      comparing the first outcome and the second outcome with a policy associated with the program; and
      determining that the software patch in the second instance of the program has executed correctly based at least in part on the comparison; and
   continuing, using the hardware processor, to execute the second instance of the program that has been modified by the software patch.

2. The method of claim 1, further comprising comparing the second outcome with a predefined end-state of the program.

3. The method of claim 1, wherein obtaining the first outcome and the second outcome comprises one of:
   obtaining memory traces of the first instance and the second instance;
   obtaining input and output transactions of the first instance and the second instance; and
   the combination thereof.

4. The method of claim 1, wherein the first outcome and the second outcome are obtained upon at least one of the first instance and the second instance reaching a predefined point.

5. The method of claim 1, wherein the first outcome and the second outcome are obtained upon detecting an exception of at least one of the first instance and the second instance.

6. The method of claim 1, further comprising:
   injecting a second software patch into the program;
   executing a third instance of the program that contains the second software patch concurrently with the first instance and the second instance of the program;
   obtaining a third outcome of the third instance; and
   comparing the first outcome, the second outcome and the third outcome with the policy associated with the program.

7. A method for testing software patches, the method being implemented with at least one hardware processor and a memory having computer-executable instructions stored thereon that, when executed by the at least one hardware processor, cause the at least one hardware processor to perform the method steps, comprising:
   injecting, using a hardware processor, a first software patch and a second software patch into a program;
   determining, using the hardware processor, a portion of the program modified by the first software patch and the second software patch;
   concurrently executing, using the hardware processor, a first instance of the program in which the portion of the program has been modified by the first software patch and a second instance of the program in which the portion of the program has been modified by the software patch;
   determining, using the hardware processor, that an event has been generated from the first instance of the program and the second instance of the program;
   determining, using the hardware processor, a correct execution between the first instance of the program being executed and the second instance of the program being executed by:
      obtaining a first outcome that includes state information of the first instance and a second outcome that includes state information of the second instance in response to determining that the event has been generated;
      comparing the first outcome and the second outcome with a policy associated with the program; and
      determining which of the first software patch and the second software patch executed correctly based at least in part on the comparison; and
   terminating, using the hardware processor, at least one of the first software patch and the second software patch based on the determination.

8. The method of claim 7, further comprising comparing the first outcome and the second outcome with a predefined end-state of the program.

9. The method of claim 7, wherein obtaining the first outcome and the second outcome comprises one of:
obtaining memory traces of the first instance and the second instance;
obtaining input and output transactions of the first instance and the second instance; and
the combination thereof.

10. The method of claim 7, wherein the first outcome and the second outcome are obtained upon at least one of the first instance and the second instance reaching a predefined point.

11. The method of claim 7, wherein the first outcome and the second outcome are obtained upon detecting an exception of at least one of the first instance and the second instance.

12. A system for testing software patches, the system comprising at least one hardware processor and a memory having computer-executable instructions stored thereon that, when executed by the at least one hardware processor, cause the at least one hardware processor to operate as means to implement the system, comprising:
means for injecting a software patch into a program;
means for determining a portion of the program modified by the software patch;
means for concurrently executing a first instance of the program in which the portion of the program has not been modified by the software patch and a second instance of the program in which the portion of the program has been modified by the software patch;
means for determining that an event has been generated from the first instance of the program and the second instance of the program;
means for determining a correct execution between the first instance of the program being executed and the second instance of the program being executed by obtaining a first outcome of the first instance and a second outcome of the second instance in response to determining that the event has been generated, comparing the first outcome that includes state information and the second outcome that includes state information with a policy associated with the program, and determining that the software patch in the second instance of the portion of the program has executed correctly based at least in part on the comparison; and
means for continuing to execute the second instance of the portion of the program that has been modified by the software patch.

13. The system of claim 12, further comprising means for comparing the second outcome with a predefined end-state of the program.

14. The system of claim 12, wherein means for obtaining the first outcome and the second outcome comprises one of:
means for obtaining memory traces of the first instance and the second instance;
means for obtaining input and output transactions of the first instance and the second instance; and
the combination thereof.

15. The system of claim 12, wherein the first outcome and the second outcome are obtained upon at least one of the first instance and the second instance reaching a predefined point.

16. The system of claim 12, wherein the first outcome and the second outcome are obtained upon detecting an exception of at least one of the first instance and the second instance.

17. The system of claim 12, further comprising:
means for injecting a second software patch into the program;
means for executing a third instance of the program that contains the second software patch concurrently with the first instance and the second instance of the program;
means for obtaining a third outcome of the third instance; and
means for comparing the first outcome, the second outcome and the third outcome with the policy associated with the program.

18. A system for testing software patches, the system comprising at least one hardware processor and a memory having computer-executable instructions stored thereon that, when executed by the at least one hardware processor, cause the at least one hardware processor to operate as means to implement the system, comprising:
means for injecting a first software patch and a second software patch into a program;
means for determining a portion of the program modified by the first software patch and the second software patch;
means for concurrently executing a first instance of the program in which the portion of the program has been modified by the first software patch and a second instance of the program in which the portion of the program has been modified by the software patch;
means for determining that an event has been generated from the first instance of the program and the second instance of the program;
means for determining a correct execution between the first instance of the program being executed and the second instance of the program being executed by obtaining a first outcome that includes state information of the first instance and a second outcome that includes state information of the second instance in response to determining that the event has been generated, comparing the first outcome and the second outcome with a policy associated with the program, and determining which of the first software patch and the second software patch executed correctly based at least in part on the comparison; and
means for terminating at least one of the first software patch and the second software patch.

19. The system of claim 18, further comprising means for comparing the second outcome with a predefined end-state of the program.

20. The system of claim 18, wherein means for obtaining the first outcome and the second outcome comprises one of:
means for obtaining memory traces of the first instance and the second instance;
means for obtaining input and output transactions of the first instance and the second instance; and
the combination thereof.

21. The system of claim 18, wherein the first outcome and the second outcome are obtained upon at least one of the first instance and the second instance reaching a predefined point.

22. The system of claim 18, wherein the first outcome and the second outcome are obtained upon detecting an exception of at least one of the first instance and the second instance.

* * * * *